Oct. 8, 1968  C. E. GILMAN ET AL  3,405,359
EXTENDED-RANGE INDICATING INSTRUMENTS
Filed May 25, 1965  2 Sheets-Sheet 1
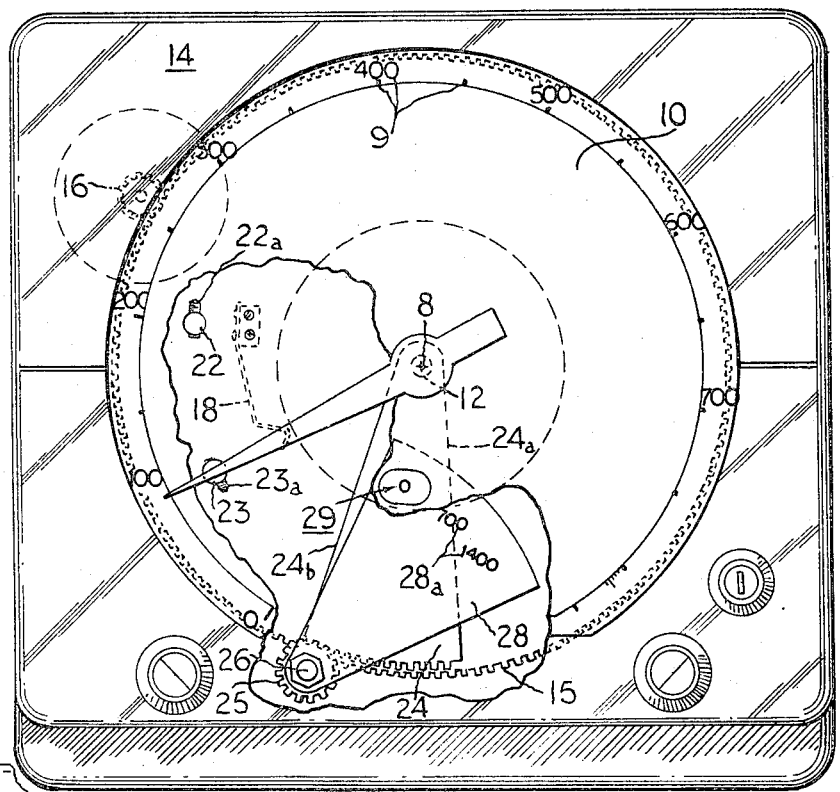
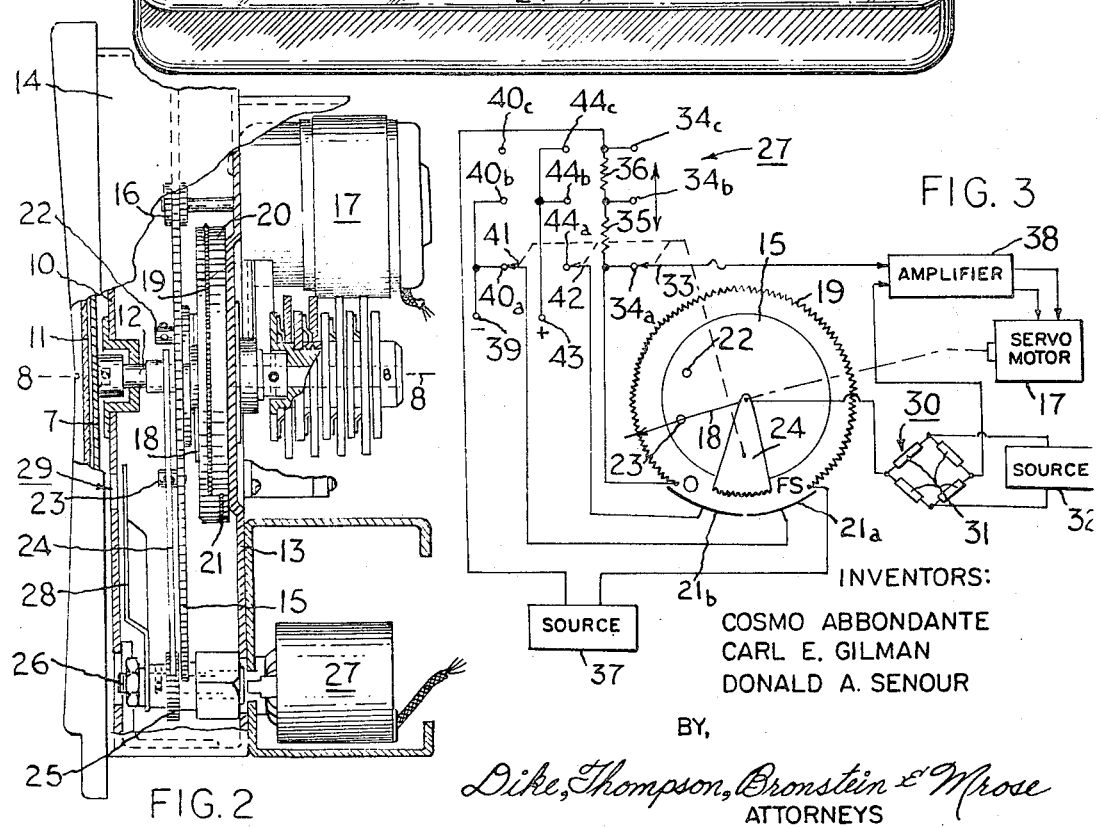
INVENTORS:
COSMO ABBONDANTE
CARL E. GILMAN
DONALD A. SENOUR
BY,
Dike, Thompson, Bronstein & Mrose
ATTORNEYS

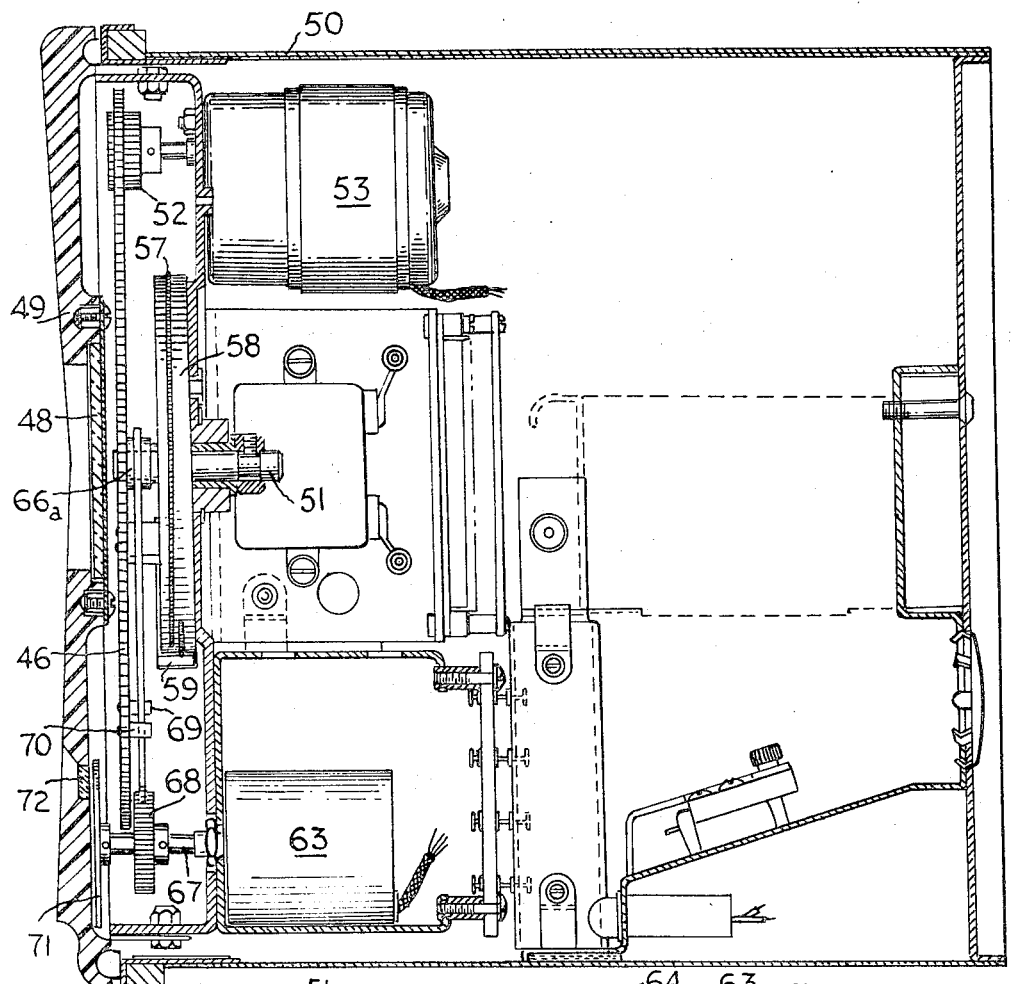
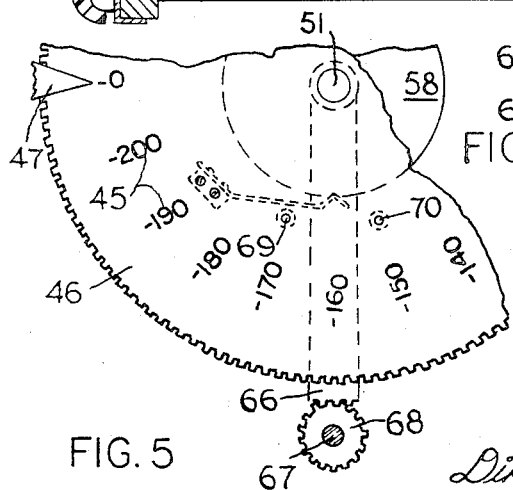
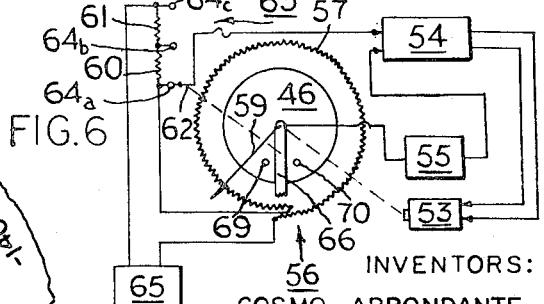

United States Patent Office 3,405,359
Patented Oct. 8, 1968

3,405,359
EXTENDED-RANGE INDICATING
INSTRUMENTS
Carl E. Gilman, Reading, Cosmo Abbondante, Burlington, and Donald A. Senour, Carlisle, Mass., assignors to BLH Electronics, Inc., Waltham, Mass., a corporation of Delaware
Filed May 25, 1965, Ser. No. 458,533
13 Claims. (Cl. 324—131)

ABSTRACT OF THE DISCLOSURE

An indicating instrument, having a pointer rotated in company with a rebalancing potentiometer by a servo motor, is provided with a pair of electrical contacts auxiliary to the adjacent ends of the potentiometer and held at electrical potentials which cause the associated servo motor to drive the pointer further upscale or downscale forcefully and, at the same time, to set a resistance-bank switch and range indicator which place the instrument in an appropriate one of multiple operating ranges, both electrically and visually.

---

The present invention relates to improvements in indicating capabilities of instruments, and, in one particular aspect, to novel and improved servo-actuated indicators in which heightened precision is uniquely achieved by way of simple and economical automatic zero-suppression equipment which promotes use of a single scale for accurate measurements of data falling in ranges which are multiples of the scale.

It has been known earlier that indicating instruments having a prescribed measurement range for a dial, pointer, or the like, may be used for measurements beyond the prescribed range by essentially subtracting a predetermined full-scale quantity from the measurement data, leaving the excess to be indicated over the same scale range, using the same calibrations. This so-called "zero-suppression" technique may be exploited electrically, by subtracting voltage or current, for example, and, in an unrefined practice may involve manual switching whenever warranted by the existing measurement conditions. It is obviously distinctly advantageous that the measurement "steps" be taken automatically, without need for operator surveillance and manipulation, and that the measuring or indicating instrument be capable of responding precisely and swiftly to both increasing and decreasing input signals. Moreover, uncertainties in or ambiguities of indications should be prevented, and the automated shifts or steps should occur swiftly and positively and with clear signalling of the correction factors to be considered in the course of reading. In accordance with the present teachings, beneficial results of the aforesaid character are realized through uniquely-interrelated mechanical and electrical features of indicating instruments having servo-driven balancing-potentiometer mechanisms which are associated both with switching provisions, for automatically connecting zero-suppression resistances into the servo circuitry, and with electrical slidewire provisions which automatically inject electrical excitation signals into the servo circuitry for purposes of inducing positive switching.

It is one of the objects of the present invention, therefore, to provide novel and improved condition-responsive apparatus, such as strain gage transducer apparatus and the like, the output indications of which are displayed with high precision over wide ranges by associated servo-driven indicator equipment having uncomplicated mechanical and electrical features which automatically effect changes in the ranges of output indications as necessitated by changing measurement conditions.

Another object is to provide unique extended-range indicating instruments of the rebalancing-potentiometer type wherein zero-suppression resistances are automatically connected in circuit as needed and wherein uncertainties and ambiguities in indications are avoided.

Further, it is an object to provide rebalancing-potentiometer type indicating equipment wherein measurement coordinates are automatically shifted via electrical switching of zero-suppression resistances, the switching being effected by mechanical stops dynamically actuated by the same servo motor which drives the movable output indicator for the equipment.

A still further object is to provide economical and uncomplicated servo-driven indicating equipment involving unique slidewire provisions for automatically electrically unbalancing the indicator servo system at times and in senses which insure that measurement coordinates will be shifted to enable displays of extended-range measurements with high precision on a single scale of indications.

By way of a summary account of practice of this invention in one of its aspects, the output voltages from a generally-conventional form of measurement transducer, such as a load-responsive column equipped with strain gages connected in a bridge array exhibiting output voltages varying with the applied loadings, are compared with output voltages taken from across a special form of potentiometer which is mechanically associated with an output indicator and which, further, is electrically associated with one or more zero-suppression resistances. Depending upon the senses of the difference voltages witnessed by an associated amplifier, an electric servo motor is caused to drive the potentiometer wiper in one or the other of two possible angular directions, until the difference voltage is reduced to zero, whereupon the angular position of the wiper characterizes the value of the condition measured by the transducer. A dial- or pointer-type indicator mechanically coupled with the potentiometer wiper, and driven by the same servo motor, displays the values of the measured condition throughout an angular range of somewhat less than 360 degrees. In one preferred arrangement, the potentiometer resistance likewise extends somewhat less than 360 degrees, about the axis of rotation of its wiper, the intervening space being occupied by two angularly-spaced wide-angle contacts held fixed at different potentials which are relatively higher and lower, respectively, than the potentiometer potentials at the zero and full-scale positions of the wiper. A normally-stationary sector gear member, arranged in driving relationship to a multi-position electrical switch, is mechanically rotated through a small angle whenever engaged by one or the other of two mechanical stops actuated by the servo motor, this gear member being effective to turn the switch in one or the other angular direction whenever the potentiometer wiper is driven above the normal full-scale position or below the normal zero-scale position. At either of these times, the servo network becomes strongly unbalanced by the potentials exhibited by the contacts, and the servo motor then forcefully drives the electrical switch to a new switching position wherein it either inserts or withdraws one or more zero-suppression resistances which are effective to shift the measurement coordinates of the system. Several switching positions may be traversed in rapid succession, depending upon the measurement conditions experienced, without the potentiometer wiper and indicator being required to rotate several times. An auxiliary indicator, actuated synchronously with the switch, displays the values of measurement data which must be added to the instrument readings to characterize the full values of the measurements being made.

Although the aspects of this invention which are believed to be novel are expressed in the appended claims, additional details as to preferred practices of the invention and as to the further objects, advantages and features thereof may perhaps be most readily comprehended through reference to the following description taken in connection with the accompanying drawings, wherein:

FIGURE 1 is a front elevation of an improved automatic add-step instrument, with portions broken away to expose internal constructional details;

FIGURE 2 provides a side view of the front portion of the instrument of FIGURE 1, certain portions being sectioned and broken away to disclose internal structural features;

FIGURE 3 expresses in schematic and block-diagram conventions an application of the apparatus of FIGURES 1 and 2 in a full measurement system;

FIGURE 4 is a cross-sectioned side view of another embodiment of an improved automatic add-step instrument;

FIGURE 5 illustrates details, from the front, of certain elements appearing in the instrument of FIGURE 4; and FIGURE 6 is a partly schematic and partly block-diagrammed representation of a measurement system including the indicating equipment of FIGURES 4 and 5.

The measurement apparatus depicted in FIGURES 1 and 2 includes a pointer 7 which is angularly oriented about an axis 8—8 for indications of measured data in relation to indicia 9 on a graduated scaleplate 10 behind a window 11. Pointer shaft 12, which is rotatable about axis 8—8 in a framework 13 within the instrument casing 14, is angularly adjusted by a bull gear 15 driven by the enmeshed pinion 16 affixed to the output shaft of a reversible electric servo motor 17. Gear 15 carries an electrical wiper arm 18 at an angular position where it may rotate with it and thereby contact different portions of a circular slidewire resistance 19 which is held stationary about the outer periphery of a circular insulating member 20; for reasons explained in greater detail later herein, the two ends of this slidewire resistance are angularly spaced about the periphery of member 20, and the intervening relatively small angular expanse of that periphery is largely encompassed by two separate arcuate contacts, a portion of one of which, 21a, is visible in FIGURE 2, and the other of which, 21b, also appears in FIGURE 3. Gear 10 also supports a pair of angularly-spaced mechanical stops, 22 and 23, shown as short cylindrical elements projecting forwardly of the gear and each having a transverse adjusting screw (22a and 23a, respectively) as part thereof which may be set to vary the stopping angles. The stops 22 and 23 are disposed such that they may engage the sides 24a and 24b, respectively, of a floating sector gear member 24, which is rotatable about axis 8—8 and angularly movable in relation to the shaft 12 on which it is mounted. The toothed lower end of gear sector member 24 is meshed with a small gear 25 affixed to the actuating shaft 26 of a frame-mounted conventional type of multiposition rotary switch 27 having the usual detenting characteristics which tend to hold the switch releasable in the angular switching positions to which it is set. A sector-shaped flag member 28, bearing indicia 28a which are visible through dial window 29, is likewise secured to and angularly movable with the rotary-switch shaft 26.

An analysis of the system diagram appearing in FIGURE 3 aids in understanding the operating characteristics of the indicating mechanisms, and is therefore referred to next. That system includes a measurement transducer, 30, which is illustrated as a known form of strain-gage bridge having four electrical-resistance strain-gage elements 31 energized by an appropriate electrical power source 32 and developing output voltages related to the loadings of an elastic-metal load column (not shown) or other force-responsive member to surfaces of which they are bonded.

For purposes of producing readout indications, such as those provided by the angular orientations of pointer 7 in relation to scaleplate 10 (FIGURES 1 and 2), the bridge electrical output voltages are compared, electrically, with the voltages appearing between the wiper 18 of potentiometer slidewire resistance 19 and the movable contactor 33. The latter contactor may be connected to the tap 34a located directly at one end of slidewire 19 (as illustrated in FIGURE 3), or may instead be connected to one of the further taps 34b and 34c which are successively further displaced from the said one end of the slidewire by the interposed fixed zero-suppression resistances 35 and 36. The series combination of slidewire resistance 19 and zero-suppression resistances 35 and 36 is energized by an electrical power source 37, such that predetermined voltage drops will be developed across these series-connected resistances. Amplifier 38, of a known type and construction, responds to differences between the serially-opposed transducer and potentiometer outputs by energizing servo motor 17 to turn in the senses, dictated by the senses of the differences in these outputs, which are necessary to move wiper 18 to angular positions where these outputs are accurately counterbalanced. At balance, the servo-driven positions of wiper 18 and of the pointer 7, characterize the values of loading or other conditions sensed by transducer 30.

The system as thus far described will satisfactorily indicate the measured conditions occurring over substantially the zero (0) to full-scale (FS) arc of the potentiometer slidewire 19 when the connector 33 dwells upon the tap 34a. However, when the output voltage capabilities of transducer 30 exceed the counterbalancing voltages which may be tapped between connector 33 and wiper 18, the measurement coordinates for the system must be shifted upwardly to permit the same scaleplate markings to be read as indications of the heightened conditions being measured. In the past, this extension or expansion has been facilitated by the operator's manually switching in one or more of the zero-suppression resistances, such as 35 and 36, as needed; each of the latter resistances adds to the counterbalancing voltages obtainable from the potentiometer a voltage equal to the normal full-scale voltage developed across the entire slidewire resistance 19, and it thus becomes possible to read the indicator and add to the indicated value one or more times the value of the full-scale reading, depending upon how many zero-suppression resistances have been switched into play. Thus, measurement "steps" are taken when each resistance is added to the effective potentiometer circuitry and a full-scale value is to be added to the indicator reading; hence the significance of the terminology "add steps."

Rotary switch 27 maintains its movable connector 33 in contact with tap 34a throughout initial angular excursions of the wiper 18 and pointer 7 from positions corresponding to zero and a certain predetermined first maximum level of the measured conditions (clockwise in FIGURES 1 and 3). When the maximum level is exceeded, wiper 18 first engages the arcuate contact 21a, which is disposed in slightly overlapped relationship angularly, with the full-scale end of slidewire resistance 19, although insulated from it. The potential of this contact is maintained at some level well below that existing at the full-scale position along slidewire 19, as is designated by the negative polarity marking of voltage input terminal 39 to which the contact is coupled via tap 40a and movable connector 41. Thus, engagement of wiper 18 with contact 21a, resulting from increase in the condition under measurement, suddenly causes the counterbalancing voltage appearing between wiper 18 and connector 33 to drop to a low level, preferably to a level about slightly below the end voltage of slidewire 19. The desired system reaction to this drop involves a sudden forceful drive of the servo motor 17, tending to move the wiper 18 further in the upscale direction. At that time, gear-mounted stop 22a has also reached an angular position where it engages edge 24a of sector gear 24, and the forceful drive of gear 15 and stop 22a by servo motor 17 is effective to displace sector gear 24 clockwise by a small angular amount until the rotary switch 27 is at least indexed forward by one switching position, involving the engagement of its connector 33 with switching tap 34b. This indexing causes the voltage across zero-suppression resistance 35 to be added to the dropped voltage between wiper 18 and connector 33, raising it to a level above the maximum which was obtainable across these points while the rotary switch was in the first switching position. Unless the transducer output voltage still remains higher than the first "add-step" voltage introduced from across resistance 35, the servo motor will respond to the new unbalance condition by driving the wiper 18 and pointer 7 downscale, counterclockwise, until balance is achieved. Stop 22 disengages sector gear 24 immediately upon reversal of the servo motor drive, and thus is immediately effective to index the rotary switch forward only by one switching position, to the position of tap 34b. When the transducer output voltage either increases still further, or is found to have jumped quickly to above even the level for balance in the first "add step" range, the injection of the voltage from the first zero-suppression resistance, 35, does not suffice to cause the servo system to reverse the servo motor drive. Instead, the servo motor is driven further clockwise, forcefully, and thereby causes the rotary switch to be indexed to the next-succeeding switch position, where the connector 33 engages tap 34c and connects the add-step voltage from the further zero-suppression resistance 36 to be injected into the servo system. Depending upon system requirements, there may be any further desired number of zero-suppression resistances arranged in series with resistances 35 and 36, with similar taps similarly disposed for engagement by the rotary-switch connector 33, to enlarge the measurement capacity.

Switch connector 41, which moves in synchronism with connector 33, engages the successive taps 40a and 40b to insure that the desired lowered voltages are applied via arcuate contact 21a. However, the connector 41 need not and should not apply the lowered voltage to contact 21a when the rotary switch has been indexed to switch in the last of the zero-suppression resistances, else the servo motor would then uselessly exert excess torques; this condition is avoided by omitting any connection between final tap 40c and the voltage terminal 39. The illustrated system will respond to a sudden near-maximum output voltage from the transducer by quickly rotating its pointer fully upscale and then successively indexing the rotary switch to the maximum add-step condition, after which the pointer will be rotated further, clockwise, until it comes to rest at the proper angular position along the scale. In the course of the indexing of the rotary switch 27, the sector shaped flag 28, fixed with the switch shaft 26, is also indexed, synchronously, such that its successive indicia markings are brought into view through the dial opening 29. The values of these exposed markings are to be added to whatever pointer readings exist at any time. As each add step is taken, the coordinates for the indicating system are effectively shifted, and thus the indicator does not lose precision (i.e., the same incremental angular movements represent the same incremental changes in the measured load or other condition, from minimum to maximum capacity of the system).

When the pointer moves downscale, counterclockwise, from a high reading in an add-step range, the other stop, 23, ultimately engages the leading edge 24b of sector gear 24, and the slidewire wiper arm 18 engages the arcuate contact 21b which is normally maintained at a higher level of voltage than that existing at the lower end of slidewire 19. Preferably, contact 21b is in angularly overlapping relationship with the lower end (zero-scale end) of the slidewire, but is insulated from it and from the adjacent arcuate contact 21a. Like contact 21a, it is conveniently mounted on the periphery of the stationary insulating disk 20. Electrical contacting of wiper 18 with contact 21b results in the servo system's becoming sufficiently unbalanced to cause the servo motor 17 to drive the bull gear, pointer and wiper counterclockwise, forcefully. Sector gear 24 must follow, and thus indexes the rotary switch to cut out successive ones of the zero-suppression resistances, as needed to restore balance. When sufficient zero-suppression resistance has been removed, the servo system then reacts by driving the pointer upscale (clockwise) and thereby achieves balance and a proper indication for the measurement condition being experienced. Rotary-switch contactor 42, which moves in synchronism with contactors 33 and 41, serves to apply the needed positive voltage from supply terminal 43 to arcuate contact 21b only when one or more of the zero-suppression resistances are effective in the servo network (i.e., when taps 44b or 44c are engaged by contactor 42), and tap 44a remains separated from terminal 43 to prevent the pointer from ever being driven below the zero-scale position representing the lowest or zero level of the measured condition. Indicator flag 28 is of course indexed synchronously with switch 27, to cause the correct changes to be made in the values appearing through dial window 29 as the add steps are reduced in the above-described manner. It will be noted that the scale markings for the indicator are of the "overrange" type, that is, that they exceed the add-step maximum (of 700 units in the illustrated case, FIGURE 1). This insures that the indicator may read upscale at the 700 units point without oscillating or wavering, and that any add-step switching which occurs will be positive because the slightly higher values which cause add-step switching will be readable just as well in the next range; thus, if the measurement is close to the value at which add-step switching is just barely induced, the indicator may be switched and will remain stably in the next range of indications.

The indicating apparatus represented in FIGURES 4–6 is of a rotating-dial type, wherein the scale markings 45 on dial 46 are read in relation to a stationary index 47 through a window 48 in the face 49 of the instrument casing 50. Dial 46 is rotatable with a frame-mounted shaft 51 and is peripherally toothed so that it may be driven by the enmeshed pinion 52 rotated by the reversible electric servo motor 53. As is shown in FIGURE 6, servo motor 53 is appropriately energized by a servo amplifier 54 which responds to the differences between output voltages from a measurement transducer 55 (such as a load member equipped with electrical resistance strain gages) and from the rebalancing-potentiometer unit 56. The latter unit includes the slidewire resistance element 57 which is peripherally affixed to the stationary insulating disk 58 concentrically with the dial shaft 51 for engagements with the wiper 59 fixed with the rotatable dial 46. It further includes a plurality of add-step or zero-suppression resistances, such as resistances 60 and 61, which are selectably introduced by engagements of the rotary connector 62 of a rotary switch 63 with the various switching taps 64a–64c. Electrical power source 65 energizes the series combination of resistances 60–61 and slidewire resistance element 57. Rotary switch 63 is indexed to the different detented or held switching positions by a narrow switching arm 66 which has gear teeth at its free end opposite the hub 66a by which it is angularly floated on dial shaft 51. Switch shaft 67 has an affixed pinion 68 disposed for engagement with and rotation through a predetermined small angle by the teeth of switching arm 66 each time that arm is rotated by the dial-mounted angularly-spaced mechanical stops 69 and 70 between which the switching arm is loosely trapped. An auxiliary dial 71 attached to switch shaft 67 exhibits markings, through window 72, which inform the operator concerning what values are to be added to the readings of the main indicating dial 46.

When dial 46 is first rotated through about one full turn, the stop 70 carried with it, forces arm 66 to turn switch shaft 67 through a small angle which indexes rotary switch contactor 62 into engagement with switch tap 64b, thereby introducing the first zero-suppression resistance 60 into the servo network. At the same time, auxiliary dial 71 is indexed to indicate that a predetermined value must be added to the ensuing indicator readings. For purposes of insuring that the servo motor will develop sufficient torque for rapid and positive switching, without hovering and uncertainty, the two ends of slidewire resistance 57 are slightly overlapped near their respective zero and full-scale positions, without being electrically connected (as shown in FIGURES 4 and 6). Thus, when dial-mounted wiper 57 engages both of these ends simultaneously, the effective voltage seen by the servo network is lowered and the system is suddenly caused to develop high servo motor forces tending to drive the dial and wiper further clockwise, through the switching position. The reverse type of action occurs when the dial is moving downscale, counterclockwise. As in the case of the embodiment of FIGURES 1–3, the dial markings are preferably of the "overrange" form, such that even a momentary contact of the wiper with the angularly-overlapping ends of the slidewire will be effective to initiate a forceful drive of the dial through the switching position and on upwardly into indications for the next-succeeding range, even though the measurement values to be indicated may be somewhat less than values in the "overrange" portion of the range below.

The apparatus which has been described may operate on either A-C or D-C excitations, and the various stops, gears, and the like, may obviously be of forms and arrangements somewhat different from those specifically illustrated. Accordingly, it should be understood that the detailed embodiments and practices herein described have been presented by way of disclosure, rather than limitation, and that various modifications, substitutions and combinations may be effected without departure either in spirit or scope from this invention in its broader aspects.

What we claim as new and desire to secure by Letters Patent of the United States is:

1. Apparatus for indicating the measurement conditions determined by electrical characteristics of a measurement transducer, comprising rebalancing potentiometer means including resistance and relatively fixed and movable connections with said resistance, means for comparing the electrical characteristics of the transducer with those appearing between said relatively fixed and movable connections, reversible servo motor means for adjusting the positions of said relatively movable connection responsive to said comparng means, movable indicator means coupled with said servo motor means for positioning thereby, said potentiometer means including a substantially circular slidewire resistance in engagement wth said relatively movable connection and a plurality of zero-suppression resistances connected in series with said slidewire resistance, a multi-postion switch including said relatively fixed connection as a relatively movable contactor and further including a plurality of contacts connected at ends of said zero-suppression resistances and disposed for separate indexed engagements with said contactor, means responsive to said servo motor means producing relative angular movements between said slidewire resistance and said relatively movable connection, said potentiometer means including means at the ends of said circular slidewire resistance engageable by said relatively movable connection for introducing through said movable connection electrical characteristics which are different from those sensed near the ends of said slidewire resistance and which are of sense tending to further unbalance any unbalanced comparison between said characteristics made by said comparing means as said relatively movable connector approaches said ends, and means responsive to said servo motor means disposed to actuate said multi-position switch in synchronism with engagements of said relatively movable connection with said means at the ends of said slidewire resistance.

2. Apparatus as set forth in claim 1 wherein said slidewire resistance is in the form of substantially one full loop, and wherein said means at the ends of said slidewire resistance comprses angularly-overlapped and insulated extensions of the ends of said loop.

3. Apparatus as set forth in claim 1 wherein said slidewire resistance is somewhat less than a full loop with the ends thereof in angularly-spaced relationship, and wherein said means at the ends of said slidewire resistance includes arcuate electrical contact means interposed between said angularly-spaced ends, and means electrically connecting said arcuate contact means with means exhibiting said different electrical characteristics.

4. Apparatus for indicating the measurement conditions determined by electrical output voltages of a measurement transducer, comprising a rotatable indicator, a reversible electric servo motor rotating said indicator responsive to electrical excitation signals, amplifier means for delivering said excitation signals to said motor responsive to difference electrical voltages applied thereto, potentiometer means including a substantially circular slidewire resistance and an electrical wiper engaged therewith mounted for relative angular movements responsive to angular movements of said servo motor and indicator, a multi-position rotary electrical switch having an angularly-movable shaft and a relatively movable connector with a plurality of contacts engageable with said connector when said shaft is indexed in different angular positions, a plurality of zero-suppression resistors connected in series with said slidewire resistance and having their respective ends connected with different ones of said contacts in a predetermined sequence, means for applying electrical excitation to said resistors and slidewire resistance in series, means applying to said amplifier the differences between electrical output voltages from the transducer and electrcal output voltages appearing across said wiper and said switch connector, means at the ends of said slidewire resistance engageable by said wiper for introducing to said amplifier through said wiper electrical unbalancing voltages which are different from those sensed near the ends of said slidewire resistance and which are of sense tending to further unbalance in the same direction any unbalance appearing between said output voltages as said wiper approaches said ends, and means angularly movable with said indicator disposed to index said rotary switch shaft in synchronism with engagements of said wiper with said means at the ends of said slidewire resistance.

5. Apparatus as set forth in claim 4 further comprising an auxiliary indicator movable with said rotary switch shaft and exhibiting markings indicating different values to be added to the readings of said rotatable indicator when said switch shaft is indexed into different angular positions.

6. Apparatus as set forth in claim 5 further comprising gear means fixed with said rotary switch means, and wherein said angularly movable means disposed to index said switch shaft comprises a drive gear having the shape of small-angle section of a circular gear mounted for angular movements about the axis of rotation of said indicator and disposed to rotate said gear means and index said rotary switch when moved angularly about said axis, and mechanical stop means disposed to connect said drive gear for follow-up angular movements with said rotatable indicator and with a predetermined relative angular freedom therebetween.

7. Apparatus as set forth in claim 6 wherein said relative angular freedom is close to 360 degrees, wherein said rotatable indicator during each turn thereof indicates values in excess of the first of said values to be added, and wherein said stop means is disposed to connect said drive gear with said rotatable indicator for upscale movement therewith only after said rotatable indicator has rotated to indicate values beyond said first of said values.

8. Apparatus as set forth in claim 6 wherein said relative angular freedom is only slightly in excess of the angular width of said drive gear, wherein said rotatable indicator during each turn thereof indicates values in excess of the first of said values to be added, and wherein said stop means is disposed to engage said drive gear with said rotary switch gear means for upscale movements therewith only after said rotatable indicator has rotated to indicate values beyond said first of said values.

9. Apparatus as set forth in claim 4 wherein said means at the ends of said slidwire resistance comprises angularly-overlapped and insulated extensions of the ends of substantially one full loop of said circular slidewire resistance.

10. Apparatus as set forth in claim 4 wherein said means at the ends of said slidewire resistance comprises a pair of separate arcuate electrical contacts interposed between angularly-spaced ends of substantially one full loop of said circular slidewire resistance, and means electrically connecting the one of said arcuate contacts nearer the zero-scale end of said slidewire resistance with a source of potential which is in excess of that at said zero-scale end and connecting the other of said arcuate contacts with a source of potential which is less than that at the full-scale end of said slidewire resistance.

11. Apparatus as set forth in claim 10 wherein said connecting means includes relatively movable contacts and connectors in said rotary switch, and wherein said relatively movable contacts and connectors disconnect said one of said arcuate contacts from its source when said switch has not introduced any of said zero-suppression resistances into the circuit between said wiper and said switch contactor and disconnect said other of said arcuate contacts from its source when said switch has introduced all of said zero-suppression resistances into said circuit.

12. Apparatus as set forth in claim 4 wherein said means at the ends of said slidewire resistance comprises arcuate electrical contact means interposed between angularly-spaced ends of substantially one full loop of said circular slidewire resistance, and means electrically exciting said contact means to exhibit electrical potential higher than that of the zero-scale end and lower than that of the full-scale end of said slidewire resistance.

13. Apparatus as set forth in claim 4 wherein said means at the ends of said slidewire resistance comprises means for impressing upon said wiper a potential intermediate the potentials at the ends of said slidewire resistance.

References Cited
UNITED STATES PATENTS

| | | | |
|---|---|---|---|
| 2,497,961 | 2/1950 | Shaw | 324—131 XR |
| 2,661,260 | 12/1953 | Salzman | 324—115 XR |
| 2,866,936 | 12/1958 | Fort | 324—131 |
| 2,981,107 | 4/1961 | Anderson | 324—115 XR |
| 3,005,156 | 10/1961 | Hoberman | 324—115 |

RUDOLPH V. ROLINEC, *Primary Examiner.*

E. F. KARLSEN, *Assistant Examiner.*